Figure 1:
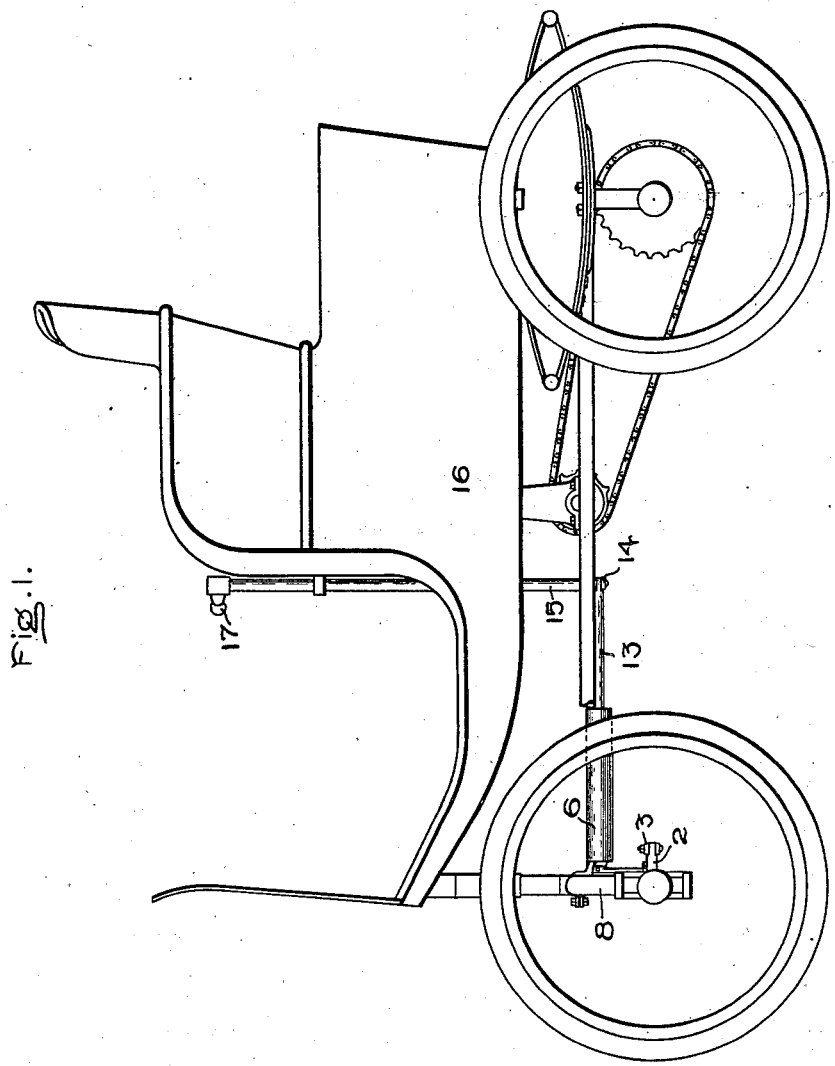

No. 723,976. PATENTED MAR. 31, 1903.
A. A. BALL, Jr.
STEERING MECHANISM FOR VEHICLES.
APPLICATION FILED APR. 17, 1902.
NO MODEL. 2 SHEETS—SHEET 1.

Witnesses:
Harry H. Tilden
Alex F. Macdonald

Inventor
Augustus A. Ball Jr.,
By Albert G. Davis
Att'y.

No. 723,976. PATENTED MAR. 31, 1903.
A. A. BALL, Jr.
STEERING MECHANISM FOR VEHICLES.
APPLICATION FILED APR. 17, 1902.
NO MODEL. 2 SHEETS—SHEET 2.
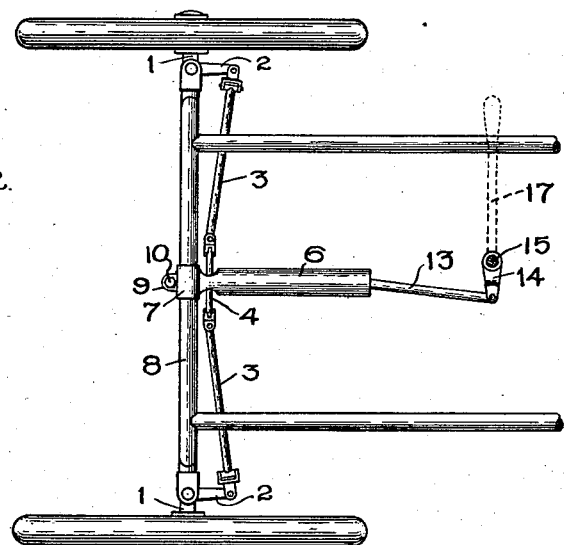
Fig. 2.
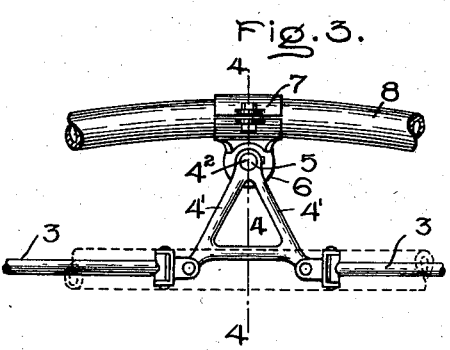
Fig. 3.
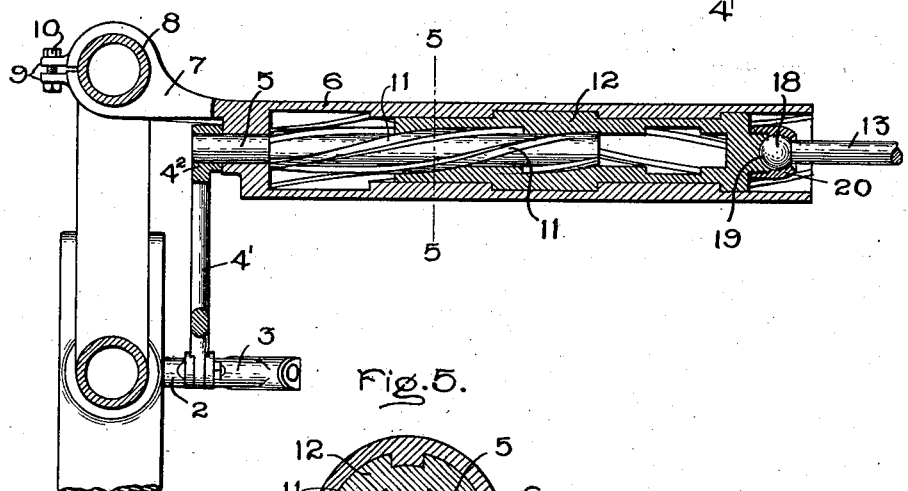
Fig. 4.
Fig. 5.
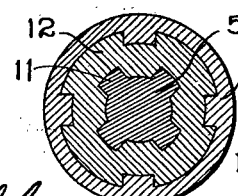
Witnesses:
Harry H. Tilden
Alex F. Macdonald
Inventor,
Augustus A. Ball Jr.,
By Albert G. Davis
Att'y.

UNITED STATES PATENT OFFICE.

AUGUSTUS A. BALL, JR., OF LYNN, MASSACHUSETTS, ASSIGNOR TO ELIHU THOMSON, OF SWAMPSCOTT, MASSACHUSETTS.

STEERING MECHANISM FOR VEHICLES.

SPECIFICATION forming part of Letters Patent No. 723,976, dated March 31, 1903.

Application filed April 17, 1902. Serial No. 103,357. (No model.)

*To all whom it may concern:*

Be it known that I, AUGUSTUS A. BALL, Jr., a citizen of the United States, residing at Lynn, county of Essex, State of Massachusetts, have invented certain new and useful Improvements in Steering Mechanism for Vehicles, of which the following is a specification.

This invention relates to mechanism for steering vehicles, and especially automobiles; and its object is to provide a simple device of this kind which is reliable in operation and is self-locking—that is to say, the tendency of the steering-wheels to change their position by reason of irregularities in the road is resisted by the mechanism and is therefore not transmitted to the steering-handle. The mechanism is such that it can be applied to any existing form of vehicle. It is light in weight, efficient in operation, pleasing in appearance, mechanically simple, and amply protected from dirt, grit, and other injurious matter. Moreover, all strains are practically confined to the forward axle, the body and steering-handle being entirely relieved therefrom.

In the accompanying drawings, Figure 1 is a side elevation of a mechanical carriage, showing a suitable mode of mounting this improved steering device. Fig. 2 is a plan view of the front portion of the running-gear and the steering mechanism. Fig. 3 is a front elevation, on a larger scale, of the steering mechanism. Fig. 4 is a side elevation of the same, partly in section, on the line 4 4, Fig. 3. Fig. 5 is a cross-section of the same on the line 5 5, Fig. 4.

The steering-axles 1 are provided with suitable lever-arms 2, which are connected by rods 3 in any suitable manner with a rocking or oscillating member 4 near the center of the axle. This member is preferably composed of two legs 4', connected with a common hub 4². It is arranged to rock in a vertical plane, being attached to a horizontal shaft 5, which is rotatably supported at its front end by passing through a suitable bearing in the front end of a horizontal cylindrical sleeve 6, provided with an arm 7, by which it can be rigidly clamped to the stationary axle 8, as by means of the lugs 9 and bolts 10. The shaft 5 extends centrally through a portion of said sleeve and is provided with ribs 11, preferably screw-threads of long pitch, similar to the rifling in a rifle-barrel. The interior of the sleeve 6 is similarly rifled, the threads running in the opposite direction to those on the shaft. In the annular space between the shaft and the sleeve is an actuator 12, which is, in effect, a double nut—that is to say, it is a cylindrical tube having internal ribs fitting the ribs on the shaft and external ribs fitting the threads in the sleeve. The rear end of the actuator is connected by a swivel-joint to the front end of a rod 13, whose rear end is pivoted to a rock-arm 14 on the lower end of the upright shaft 15, which is suitably journaled in the body 16 of the vehicle and carries at its upper end the usual steering-handle 17. The swivel-joint is preferably a ball-and-socket joint, there being a ball 18 on the end of the rod 13, which fits a cupped seat 19 in the rear end of the actuator and is secured therein by a gland 20. The joint between the rod and the rock-arm should also be flexible enough to permit some vertical vibration of the rod in order to provide for the rise and fall of the body of the vehicle on its springs.

The operation of my device is as follows: By means of the steering-handle 17 a longitudinal movement is imparted to the actuator 12, which in its travel lengthwise of the stationary rifled sleeve 6 is caused to revolve on its axis by the interaction of its external helical threads and those on the inside of the fixed sleeve. As it revolves the actuator carries with it the shaft 5, whose threads intermesh with those on the inside of the actuator; but in addition to the rotary movement thus imparted to the shaft there is an additional movement of rotation given to it by reason of the longitudinal travel of the actuator, said movement being due to the interaction of the helical threads on the actuator and shaft. The angular movement thus imparted to the shaft is therefore the sum of the relative angular movements of the actuator and sleeve and the actuator and shaft. It is thus possible to obtain a relatively large oscillating movement of the rocking member 4 by the use of a relatively short longitudinal travel of the actuator, and yet employ screw-threads of so long pitch that they are well within the angle of friction, so that the transmission of strains from the steering-axles to the steering-handle is entirely prevented and the parts will remain locked in any position to which they may be moved by the steering-handle.

What I claim as new, and desire to secure by Letters Patent of the United States, is—

1. In a vehicle, the combination with a stationary axle, of steering-wheels mounted thereon, a fixed sleeve secured thereto and having internal helical threads, a shaft rotatably supported in said sleeve and connected with said wheels, a tubular actuator engaging with said shaft and having external threads meshed with those in the sleeve, and means including a steering-handle for imparting a longitudinal movement to said actuator.

2. In a vehicle, the combination with a stationary axle, of steering-wheels mounted thereon, a fixed sleeve secured thereto and having internal helical threads, a shaft rotatably supported in said sleeve, and provided with helical threads, an actuator having internal threads meshing with those on the shaft and external threads meshing with those in the sleeve, means for moving the actuator longitudinally, and connections between the shaft and the steering-wheels.

3. In a vehicle, the combination with a stationary axle, of steering-wheels mounted thereon, a fixed sleeve secured to said axle and having internal helical threads, a shaft rotatably supported in said sleeve and having external ribs, a rocking member on the end of said shaft, connections between said rocking member and the steering-wheels, an actuator in said sleeve engaging with said shaft and with the threads in said sleeve, and means for moving the actuator longitudinally.

4. In a steering mechanism for vehicles, the combination with a fixed sleeve having internal helical threads, of a shaft rotatable therein and having similar threads running in the opposite direction, and a tubular actuator having internal threads fitting those on the shaft and external threads fitting those in the sleeve, all of said threads being within the angle of friction.

In witness whereof I have hereunto set my hand this 15th day of April, 1902.

AUGUSTUS A. BALL, Jr.

Witnesses:
 ALEX F. MACDONALD,
 DUGALD McK. McKILLOP.